(12) United States Patent　　　(10) Patent No.:　US 12,576,512 B2

Geng et al.　　　(45) Date of Patent:　Mar. 17, 2026

(54) HORIZONTAL ARTICULATED ROBOT

(71) Applicant: FANUC CORPORATION, Yamanashi (JP)

(72) Inventors: Xing Geng, Yamanashi (JP); Youhei Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 228 days.

(21) Appl. No.: 18/251,370

(22) PCT Filed: Nov. 2, 2021

(86) PCT No.: PCT/JP2021/040421

§ 371 (c)(1),
　(2) Date: Oct. 30, 2023

(87) PCT Pub. No.: WO2022/097649

PCT Pub. Date: May 12, 2022

(65) Prior Publication Data

US 2024/0051118 A1　　Feb. 15, 2024

(30) Foreign Application Priority Data

Nov. 6, 2020　(JP) ................................. 2020-186139

(51) Int. Cl.
　B25J 9/04　　　(2006.01)
　B25J 9/00　　　(2006.01)
(52) U.S. Cl.
　CPC ............. B25J 9/044 (2013.01); B25J 9/0018 (2013.01)

(58) Field of Classification Search
　CPC .......... B25J 9/0018; B25J 9/042; B25J 9/044
　See application file for complete search history.

(56) References Cited

U.S. PATENT DOCUMENTS

| | | | | |
|---|---|---|---|---|
| 4,428,710 A | * | 1/1984 | Grisebach | B25J 15/022 |
| | | | | 901/29 |
| 4,832,563 A | * | 5/1989 | Massmann | B25J 9/042 |
| | | | | 901/17 |
| 2018/0229378 A1 | * | 8/2018 | Adachi | B25J 9/0018 |
| 2020/0369477 A1 | * | 11/2020 | Otsuru | B65G 17/323 |

FOREIGN PATENT DOCUMENTS

| | | | |
|---|---|---|---|
| DE | 3323976 A1 | * | 7/1984 |
| JP | 1092077 A | | 4/1989 |
| JP | 1115586 A | | 5/1989 |
| JP | 6262555 A | | 9/1994 |

(Continued)

OTHER PUBLICATIONS

English Abstract and Machine Translation for Japanese Publication No. JP 1092077 A, published Apr. 11, 1989, 5 pgs.

(Continued)

*Primary Examiner* — Joseph Brown

(74) *Attorney, Agent, or Firm* — Fredrikson & Byron, P.A.

(57)　　　ABSTRACT

A robot (10) includes a fixed part (20), a first arm (21), a second arm (22), and a working shaft (25). The second arm (22) is longer than the first arm (21). A protrusion length of the working shaft (25), which is capable of protruding from the second arm (22) toward the fixed part (20) is longer than a distance between the first arm (21) and the second arm (22).

3 Claims, 8 Drawing Sheets

(56) References Cited

FOREIGN PATENT DOCUMENTS

| | | | |
|---|---|---|---|
| JP | 2003220586 | A | 8/2003 |
| JP | 2005193347 | A | 7/2005 |
| JP | 2007044655 | A | 2/2007 |
| JP | 4873946 | B | 12/2011 |
| JP | 5208323 | B | 3/2013 |
| JP | 2016500473 | A | 1/2016 |
| JP | 2018161726 | A | 10/2018 |
| KR | 20200031188 | A * | 3/2020 |
| WO | WO-2019196068 | A1 * | 10/2019 |

OTHER PUBLICATIONS

English Abstract and Machine Translation for Japanese Publication No. JP 6262555 A published Sep. 20, 1994 16 pgs.

English Abstract and Machine Translation for Japanese Publication No. JP 1115586 A, published May 8, 1989, 4 pgs.

English Abstract and Machine Translation for Japanese Publication No. JP 2003-220586 A, published Aug. 5, 2003, 26 pgs.

English Abstract and Machine Translation for Japanese Publication No. JP 2005193347 A, published Jul. 21, 2005, 17 pgs.

English Abstract and Machine Translation for Japanese Publication No. JP 2016-500473 A, published Jan. 12, 2016, 36 pgs.

English Abstract and Machine Translation for Japanese Publication No. JP 5208323 B, published Mar. 1, 2013, 11 pgs.

English Abstract and Machine Translation for Japanese Publication No. JP 4873946 B, published Dec. 2, 2011 25 pgs.

PCT International Search Report dated Jan. 25, 2022 for related International Application No. PCT/JP2021/040421, from which the instant application is based, 2 pgs.

* cited by examiner

HORIZONTAL ARTICULATED ROBOT

RELATED APPLICATIONS

This application is a 35 U.S.C. 371 national phase filing from International Application No. PCT/JP2021/040421, filed Nov. 2, 2021, which claims priority to Japanese Application No. 2020-186139, filed, 2020 Nov. 6, the contents of which are incorporated herein by reference.

FIELD

The present invention relates to a horizontal articulated robot.

BACKGROUND

Horizontal articulated robots, also referred to as SCARA robots, are widely used in factories. Horizontal articulated robots conventionally comprise a first arm which is rotatably attached to a fixed part, a second arm which is rotatably attached to the first arm, and a working shaft provided on the second arm.

In horizontal articulated robots, the first arm and second arm move in the horizontal plane to move the working shaft to the desired position, and at that position, the working shaft is raised and lowered/rotated to perform various operations.

For example, Japanese Patent No. 5208323 (Patent Literature 1) and Japanese Unexamined Patent Publication (Kokai) No. 2005-193347 (Patent Literature 2) disclose suspended horizontal articulated robots. Further, Japanese Patent No. 4873946 (Patent Literature 3) discloses a floor-mounted horizontal articulated robot.

CITATION LIST

Patent Literature

[PTL 1] Japanese Patent No. 5208323
[PTL 2] Japanese Unexamined Patent Publication (Kokai) No. 2005-193347
[PTL 3] Japanese Patent No. 4873946

SUMMARY

Technical Problem

In the suspended horizontal articulated robots disclosed in Japanese Patent No. 5208323 (Patent Literature 1) and Japanese Unexamined Patent Publication (Kokai) No. 2005-193347 (Patent Literature 2), the first arm and the second arm have approximately the same length. To prevent the working shaft from interfering with the first arm, it is necessary to keep one end of the working shaft below the lower surface of the first arm. As a result, the vertical stroke of the working shaft is restricted, and lengthening of the working shaft itself is also restricted.

In a floor-mounted horizontal articulated robot as disclosed in Japanese Patent No. 4873946 (Patent Literature 3), the working shaft cannot be moved to the axis of rotation between the first arm and the fixed part, and as a result, a dead zone occurs.

Thus, there is a demand for a horizontal articulated robot with which a long working shaft can be secured without the occurrence of dead zones.

Solution to Problem

According to a first aspect of the present disclosure, there is provided a horizontal articulated robot which is suspended from a pedestal or ceiling, comprising a fixed part, a first arm which is supported by the fixed part so as to be rotatable about a first axis of rotation, a second arm which is supported by the first arm so as to be rotatable about a second axis of rotation parallel to the first axis of rotation, on a far side with respect to the fixed part, and a working shaft which is attached to the second arm so as to be rotatable about a third axis of rotation parallel to the second axis of rotation and capable of moving up and down, wherein a first distance between the first axis of rotation and the second axis of rotation is shorter than a second distance between the second axis of rotation and the third axis of rotation, and a protrusion length of the working shaft, which is capable of protruding from the second arm toward the fixed part, is longer than a third distance between the first arm and the second arm along the second axis of rotation.

Advantageous Effects of Invention

In the first aspect, since the first distance is shorter than the second distance, the working shaft can protrude toward the fixed part beyond the height of the lower surface of the first arm. Thus, a long working shaft can be secured, and the stroke of the working shaft can be lengthened.

The object, features, and advantages of the present invention will be further clarified by means of the following descriptions of the embodiments in association with the attached drawings.

DESCRIPTION OF EMBODIMENTS

Figure 1A:
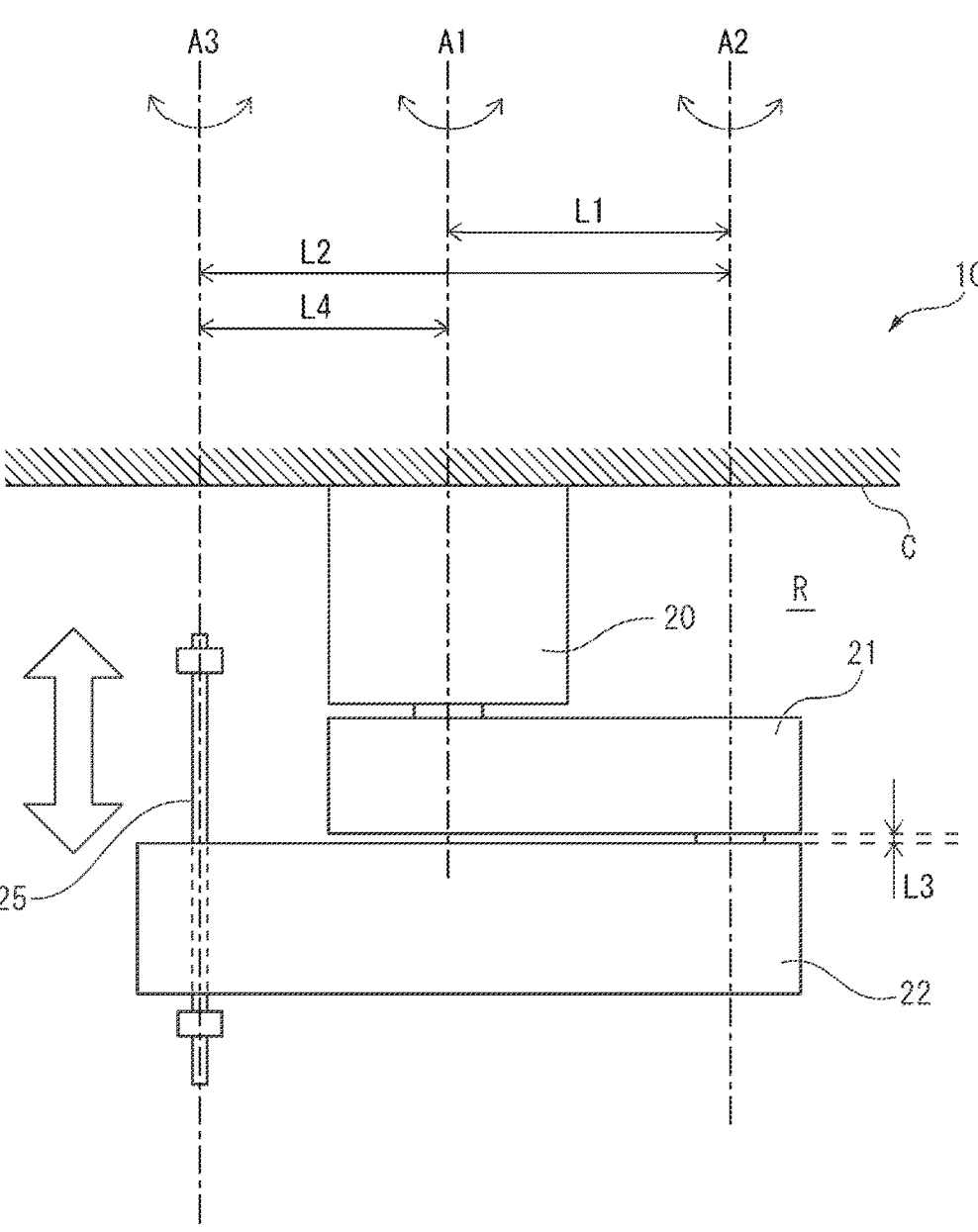
FIG. 1A is a side view of a horizontal articulated robot according to a first embodiment.

The embodiments of the present invention will be described below with reference to the attached drawings. In the drawings, corresponding constituent elements are assigned common reference signs.

FIG. 1A is a side view of a horizontal articulated robot in the first embodiment. The robot 10 shown in FIG. 1A is a horizontal articulated robot, and is suspended from a ceiling C of a room R. The robot 10 mainly comprises a fixed part 20 to be affixed to the ceiling C, a first arm 21 which is rotatably attached to the fixed part 20, a second arm 22 which is rotatably attached to the first arm 21, and a working shaft 25 provided with the second arm 22.

Specifically, the proximal end of the first arm 21 is supported by the fixed part 20 so as to be rotatable about a first axis of rotation A1. Further, the distal end of the first arm 21 is supported by the proximal end of the second arm 22 so as to be rotatable about a second axis of rotation A2 parallel to the first axis of rotation A1. Thus, the second arm 22 is positioned below the first arm 21 when the robot 10 is suspended. Therefore, the rotating surface of the first arm 21 and the rotating surface of the second arm 22 are offset in the vertical direction and do not interfere with each other.

The working shaft 25 is attached to the distal end of the second arm 22. The working shaft 25 is attached so as to be rotatable about a third axis of rotation A3 parallel to the second axis of rotation A2 and capable of moving up and down. When the robot 10 is suspended, an end effector (which is described later) to be attached to the distal end of the working shaft 25 performs predetermined operations below the second arm 22.

A first motor and a first speed reducer for driving the first arm 21 are arranged in the fixed part 20. Likewise, a second motor and a second speed reducer for driving the second arm 22 are arranged at predetermined locations in the first arm 21. Further, a third motor for moving upward and downward and rotating the working shaft 25 is arranged at a predetermined location in the second arm 22.

Note that the first to third motors, the first speed reducer, and the second speed reducer may be provided at other locations on the robot 10. For example, the second motor and/or the second speed reducer may be arranged in a joint part 23 (which is described later) provided between the first arm 21 and the second arm 22. Since the basic configuration of the robot 10 is publicly known, a detailed description thereof has been omitted.

As shown in FIG. 1A, a first distance L1 between the first axis of rotation A1 and the second axis of rotation A2 is shorter than a second distance L2 between the second axis of rotation A2 and the third axis of rotation A3. In other words, the second arm 22 is longer than the first arm 21.

Further, the proximal end of the working shaft 25 protrudes from the upper surface of the second arm 22 towards the fixed part 20. The protrusion length of the working shaft 25 is longer than a third distance L3 between the first arm 21 and the second arm 22 along the second axis of rotation A2.

In FIG. 1A, the first arm 21 and the second arm 22 of the robot 10 are arranged so as to extend in opposite directions. Even in such a case, since the second arm 22 is longer than the first arm 21, the projecting portion of the working shaft 25 projecting from the second arm 22 toward the fixed part 20 does not interfere with the first arm 21. In other words, in the present embodiment, the working shaft 25, in which the protruding length of the protruding portion is longer than the third distance L3, can be used. Since a long working shaft 25 can be used in this manner, the stroke of the working shaft 25 can also be lengthened, whereby the movable range of the robot 10 can be widened.

Figure 1B:
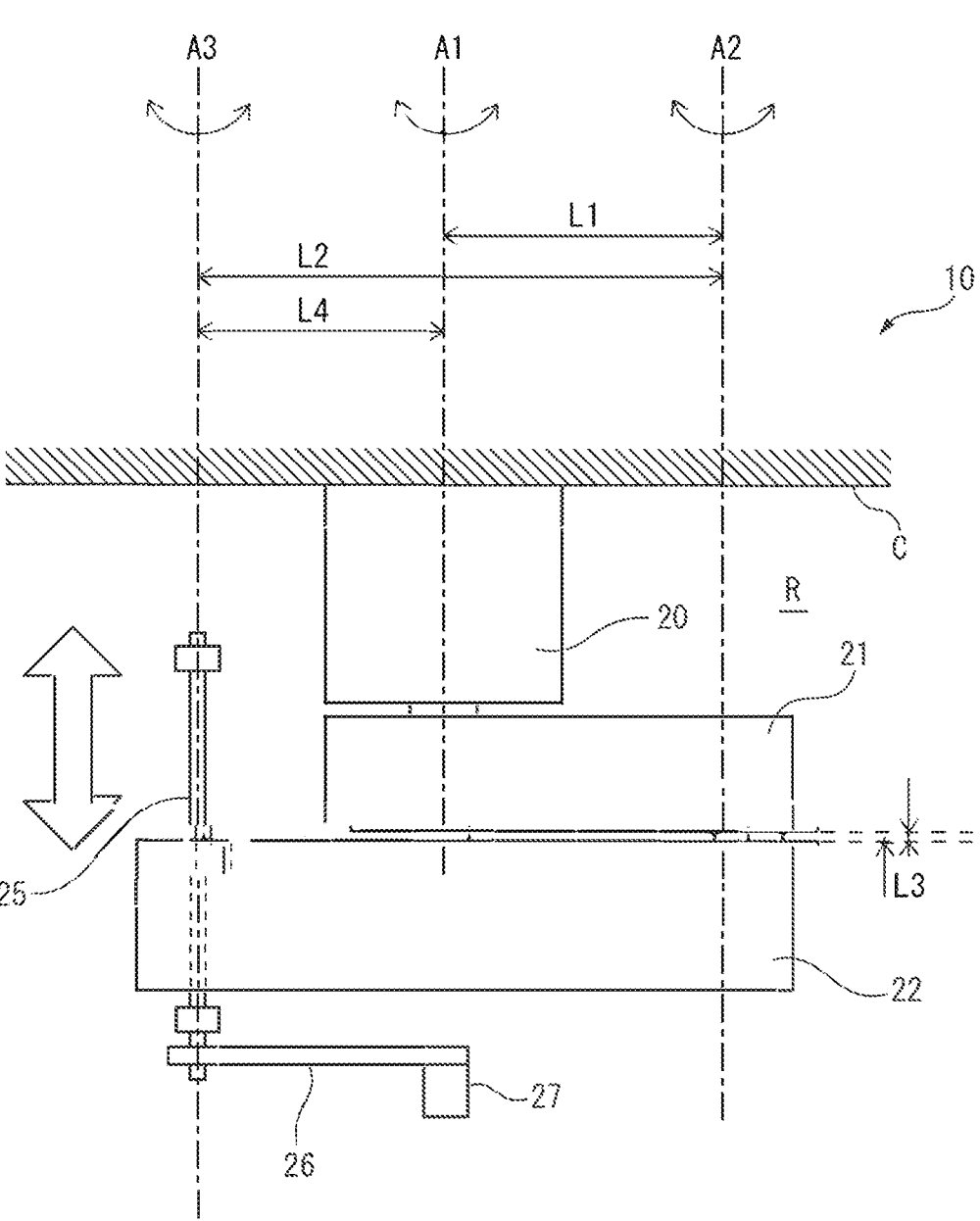
FIG. 1B is a side view of a horizontal articulated robot according to another embodiment.

FIG. 1B is a side view of a horizontal articulated robot according to another embodiment. In FIG. 1B, the proximal end of an offset member 26 is rotatably attached to the distal end of working shaft 25. The offset member 26 extends perpendicular to the working shaft 25 and the third axis of rotation A3. In other words, the offset member 26 extends parallel to the second arm 22 on the bottom side of the second arm 22. Further, an end effector 27 is attached to the distal end of the offset member 26.

As shown in FIG. 1B, the distance between the first axis of rotation A1 and the third axis of rotation A3 when the first arm 21 and the second arm 22 are arranged to extend in mutually opposite directions is defined as a fourth distance L4. In FIG. 1B, the length of the offset member 26 is greater than or equal to the fourth distance L4.

In such a configuration, when the first arm 21 and the second arm 22 are arranged to extend in opposite directions, the distal end of the offset member 26 reaches the first axis of rotation A1 on the lower side of the second arm 22. Thus, the end effector 27 can reach up to the first axis of rotation A1. Therefore, in the present embodiment, the occurrence of dead zones about the first axis of rotation A1 can be prevented.

Figure 2:
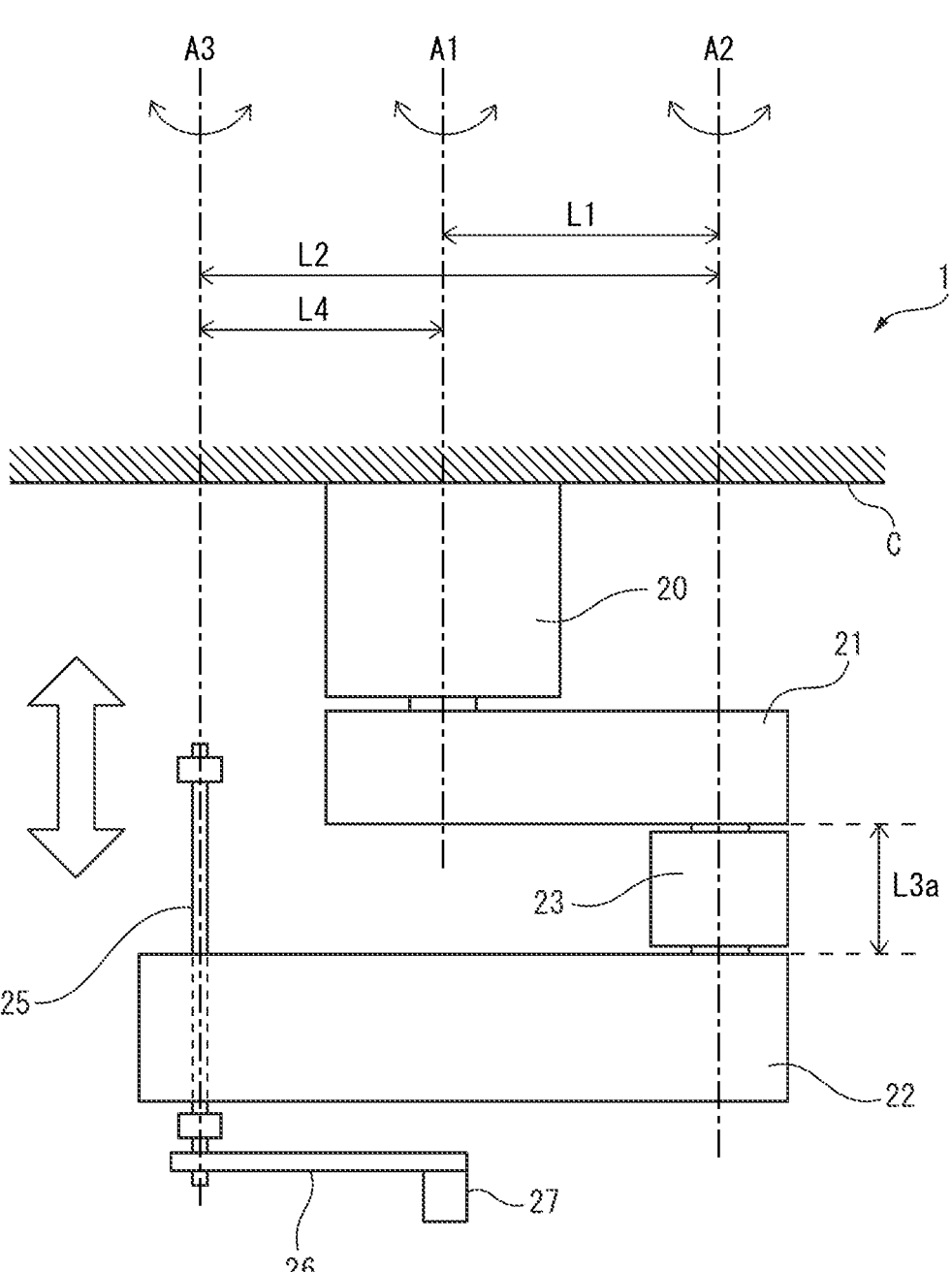
FIG. 2 is a side view of a modified example of the horizontal articulated robot according to the first embodiment.

FIG. 2 is a side view of a modified example of the horizontal articulated robot according to the first embodiment. In FIG. 2, a joint part 23 is provided between the first arm 21 and the second arm 22. The joint part 23 may be integrated with either the first arm 21 or the second arm 22. The joint part 23 is advantageous for mitigating torsion in an umbilical member (not illustrated) extending from the fixed part 20 through the first arm 21.

In FIG. 2, a third distance L3a between the first arm 21 and the second arm 22 along the second axis of rotation A2 substantially corresponds to the height of the joint part 23. In such a case, a protrusion length of the working shaft 25, which projects from the second arm 22, can be made equal to or longer than the third distance L3a, whereby a longer working shaft 25 can be used. As a result, the robot can have a wider range of motion. Furthermore, the robots 10 according to other embodiments, which are described later, may have a similar joint pail 23, and even such a case is included within the scope of the present disclosure.

Figure 3:
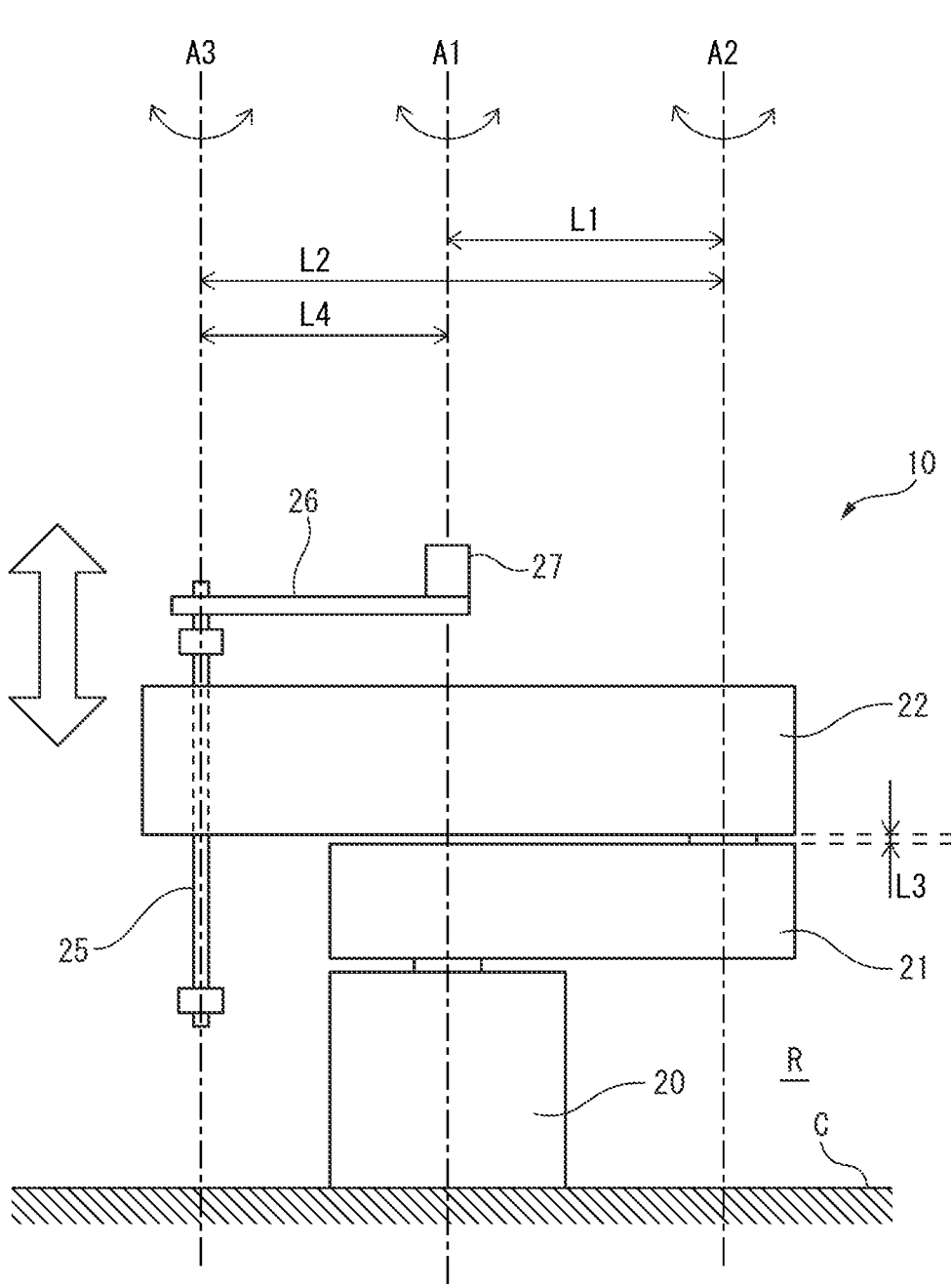
FIG. 3 is a side view of a horizontal articulated robot according to a second embodiment.

FIG. 3 is a side view of a horizontal articulated robot according to a second embodiment. In FIG. 3, the fixed part 20 of the robot 10, which is identical to that described above, is affixed to a floor L of the room R. Thus, the second arm 22 is positioned above the first arm 21 in the state of FIG. 3.

In the same manner as described above, the second arm 22 is longer than the first arm 21. Thus, a longer working shaft 25 which extends downwards beyond the upper surface of the first arm 21 can be used. As a result, the movable range of the robot 10 can be widened.

Further, the proximal end of the offset member 26, which is identical to that described above, is rotatably attached to the distal end of the working shaft 25. The length of the offset member 26 is equal to or greater than the fourth distance LA between the first axis of rotation A1 and the third axis of rotation A3 when the first arm 21 and the second arm 22 are arranged so as to extend in mutually opposite directions. Thus, the end effector 27 attached to the distal end of the offset member 26 can reach the first axis of rotation A1 above the second arm 22. Therefore, the occurrence of dead zones can be prevented.

Figure 4A:
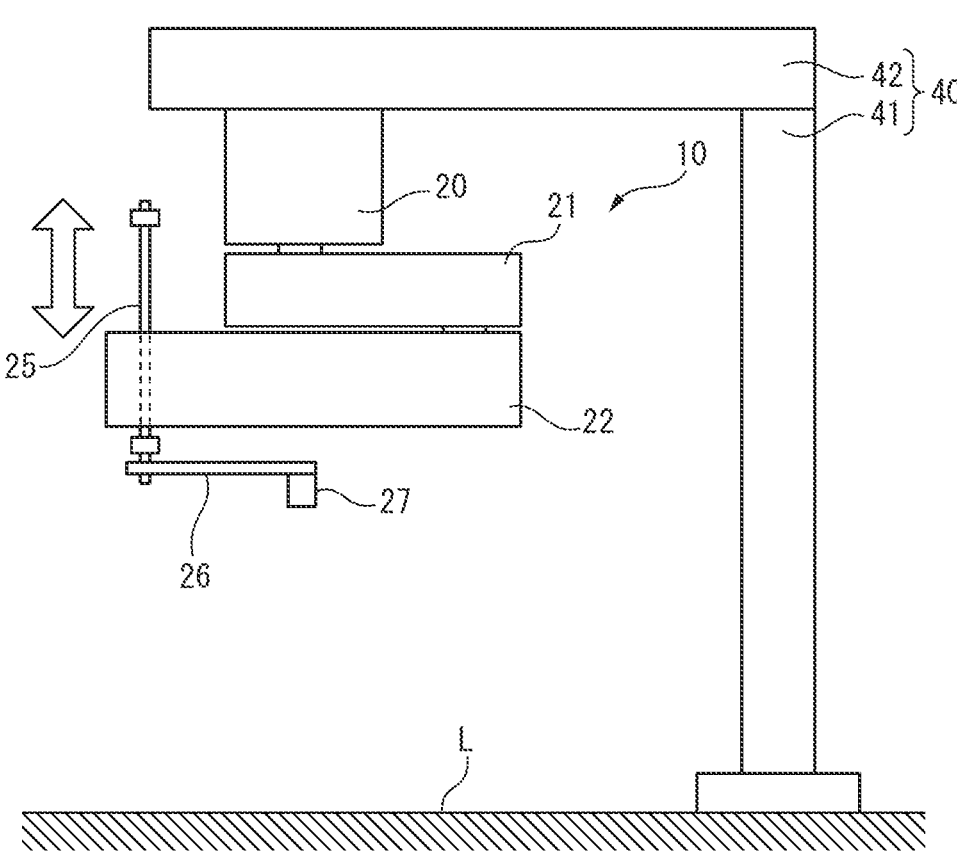
FIG. 4A is a side view of a horizontal articulated robot according to a third embodiment.
Figure 4B:
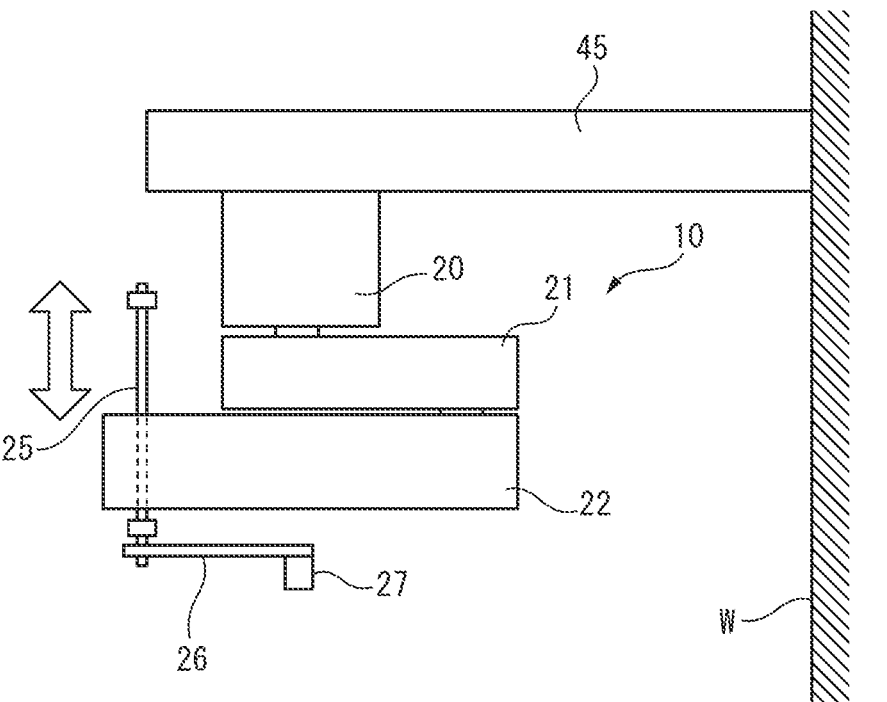
FIG. 4B is a side view of another horizontal articulated robot according to the third embodiment.

FIG. 4A is a side view of a horizontal articulated robot according to a third embodiment. The robot 10 shown in FIG. 4A is suspended on from a pedestal 40. The pedestal 40 comprises a column 41 extending perpendicularly from the floor L and a beam 42 extending horizontally from the column 41. The fixed part 20 of the robot 10 is affixed to the distal lower surface of the beam 42. Furthermore, FIG. 4B is a side view of another horizontal articulated robot according to the third embodiment. The robot 10 shown in FIG. 4B is suspended from the distal lower surface of another beam-shaped pedestal 45 extending from a wall W.

It is clear that even in the cases shown in FIGS. 4A and 4B, the same effects as described above can be obtained. The same is true when the robot 10 is suspended so that the side surface of the fixed part 20 is attached to the end face of the beam 42 or the pedestal 45.

Figure 5:
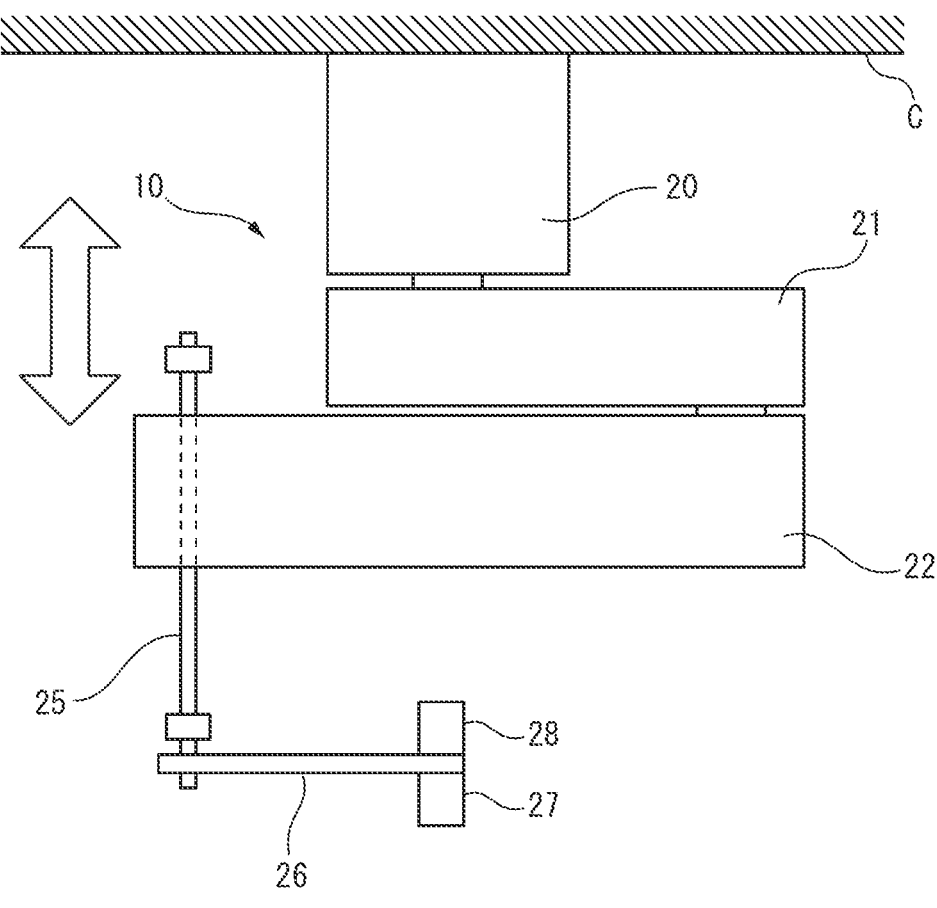
FIG. 5 is a side view of a horizontal articulated robot according to yet another embodiment.

FIG. 5 is a side view of a horizontal articulated robot according to yet another embodiment. The offset member 26 shown in FIG. 5 comprises an end effector 27 and a drive part 28 for driving the end effector 27, for example, a servo motor. The drive part 28 may be provided on the opposite side of the end effector 27 or may be incorporated into the end effector 27. By providing such a drive part 28, the end effector 27 can perform additional actions, for example, screwing actions.

Figure 6:
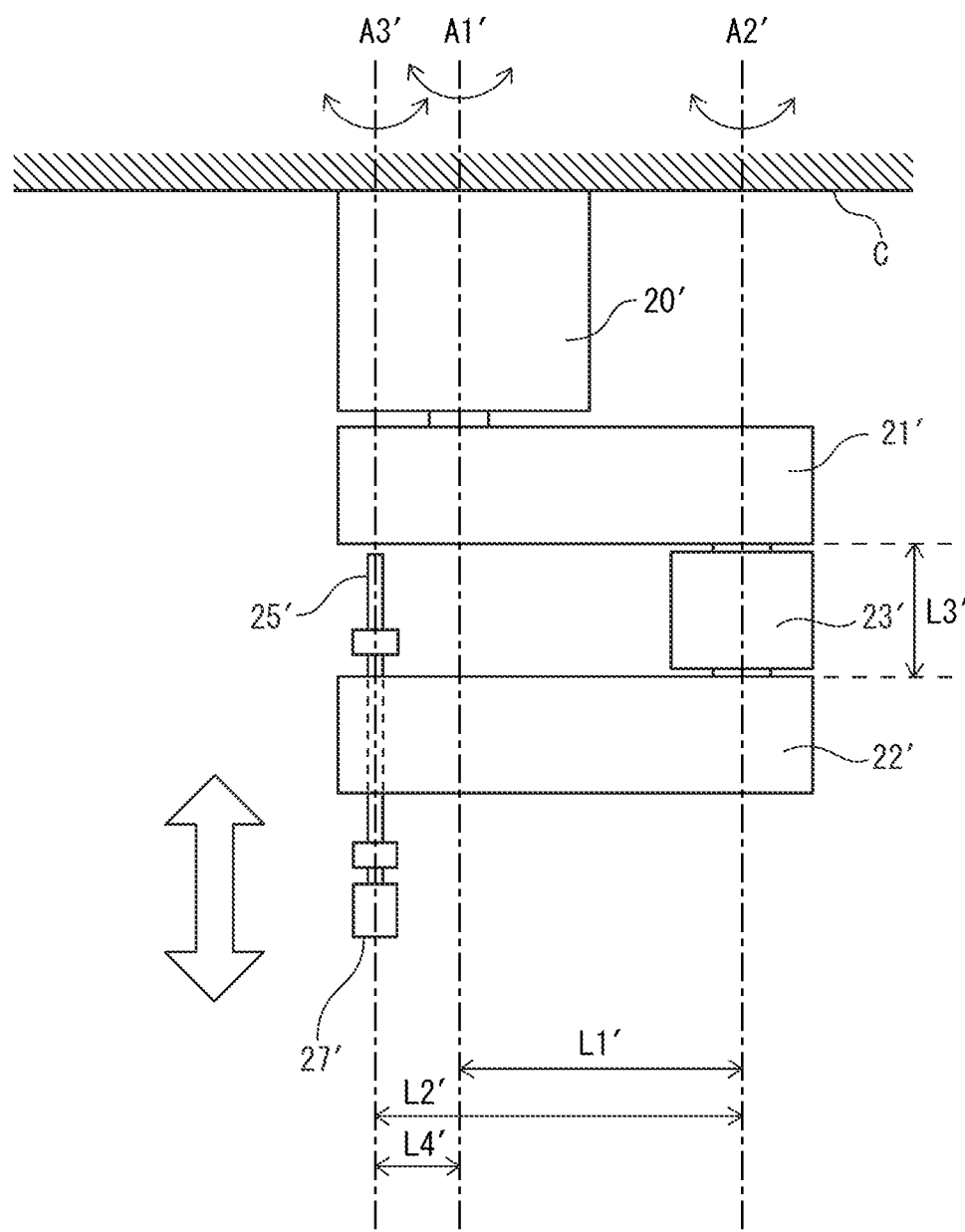
FIG. 6 is a side view of a horizontal articulated robot according to the prior art.

FIG. 6 is a side view of a horizontal articulated robot according to the prior art. The suspended horizontal articulated robot 10' shown in FIG. 6 comprises a fixed part 20', a first arm 21' supported by the fixed part so as to be rotatable about a first axis of rotation A1', a second arm 22' supported by the first arm 21' so as to be rotatable about the second axis of rotation A2', and a working shaft 25' mounted so as to be rotatable about a third axis of rotation A3' and capable of moving up and down.

In FIG. 6, the lengths of the first arm 21' and the second arm 22' are equal to each other. In other words, the second distance L1' between the first axis of rotation A1' and the second axis of rotation A2' and the first distance L2' between the second axis of rotation A2' and the third axis of rotation A3' are equal. Thus, the length of the working shaft 25' is determined in accordance with the height of the joint part 23', and the working shaft 25' cannot extend beyond the lower surface of the first arm 21'. In other words, there is a problem in that a long working shaft 25' cannot be secured. Furthermore, the length of the working shaft 25' is further restricted when a joint part 23' is not present.

Figure 7:
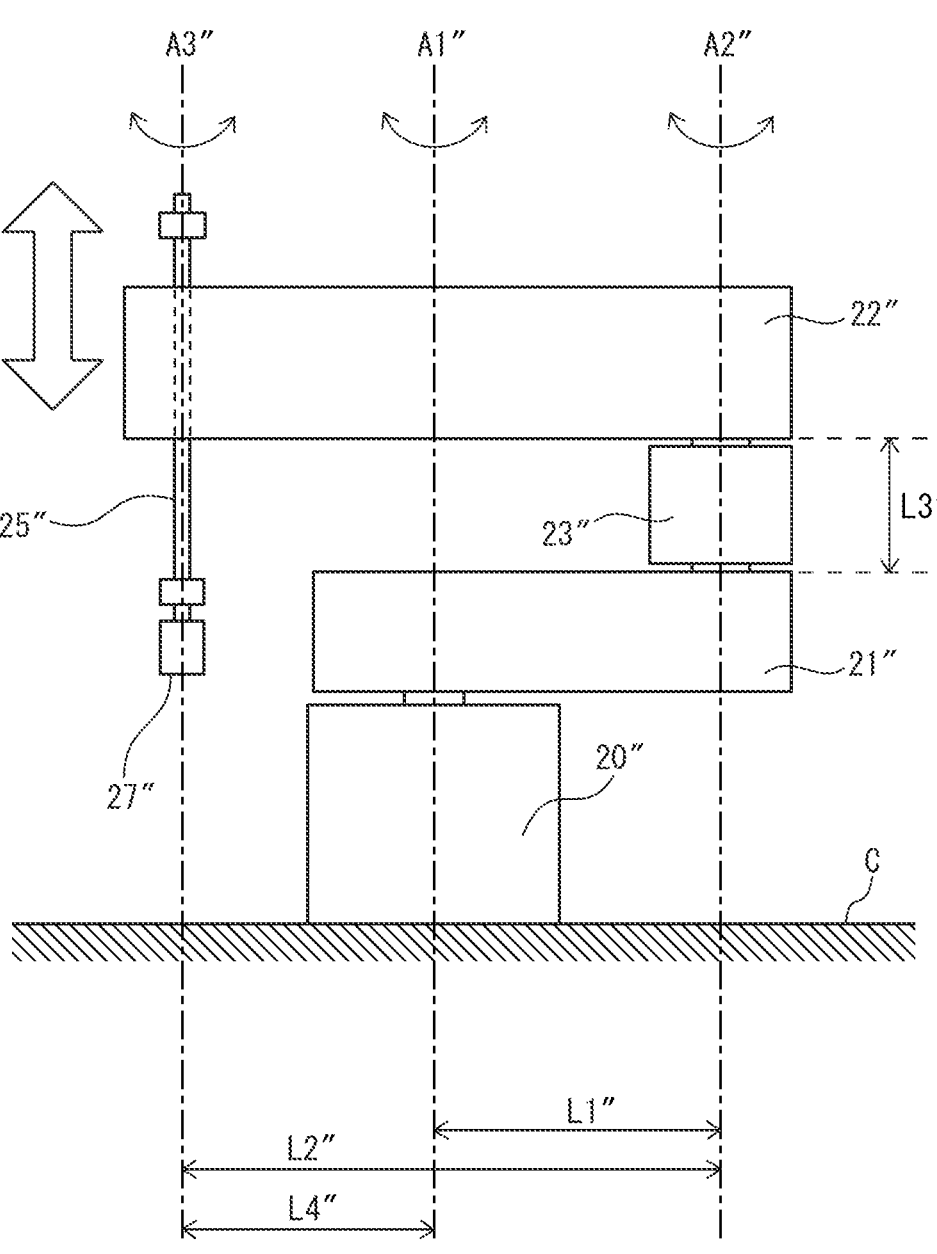
FIG. 7 is a side view of another horizontal articulated robot according to the prior art.

Further, FIG. 7 is a side view of a horizontal articulated robot according to the prior art. As shown in FIG. 7, the floor-mounted horizontal articulated robot 10" comprises a fixed part 20", a first arm 21" supported by the fixed part so as to be rotatable about a first axis of rotation A1", a second arm 22" supported by the first arm 21" so as to be rotatable about a second axis of rotation A2", and a working shaft 25" mounted so as to be rotatable about a third axis of rotation A3" and capable of moving up and down.

In FIG. 7 the working shaft 25" does not comprise an offset member. Thus, even in the illustrated state, the end effector 27" provided on the working shaft 25" cannot move to the vicinity of the first axis of rotation A1", resulting in a problem in that there is a dead zone.

Conversely, in the present disclosure, a long working shaft can be secured without the occurrence of dead zones as described above. It should be noted that appropriately combining the above-described embodiments is included within the scope of the present disclosure.

Aspects of the Present Disclosure

According to the first aspect, there is provided a horizontal articulated robot (10) which is suspended from a pedestal (40, 45) or ceiling (C), comprising a fixed part (20), a first arm (21) which is supported by the fixed part so as to be rotatable about a first axis of rotation (A1), a second arm (22) which is supported by the first arm so as to be rotatable about a second axis of rotation (A2) parallel to the first axis of rotation, on a far side with respect to the fixed part, and a working shaft (25) which is attached to the second arm so as to be rotatable about a third axis of rotation (A3) parallel to the second axis of rotation and capable of moving up and down, wherein a first distance (L1) between the first axis of rotation and the second axis of rotation is shorter than a second distance (L2) between the second axis of rotation and the third axis of rotation, and a protrusion length of the working shaft, which is capable of protruding from the second arm toward the fixed part, is longer than a third distance (L3) between the first arm and the second arm along the second axis of rotation.

According to the second aspect, in the first aspect, there is further provided an offset member (26) which is rotatably supported by the working shaft on a distal end of the working shaft, wherein a length of the offset member extending perpendicularly from the third axis of rotation is set so as to be equal to or greater than a fourth distance (L4) between the first axis of rotation and the third axis of rotation when the first arm and the second arm extend in directions opposite to each other.

According to the third aspect, in the first or second aspect, there is further provided a joint part (23) arranged between the first arm and the second arm.

According to the fourth aspect, in any of the first to third aspects, there is further provided an end effector (27) attached to a distal end of the offset member, and a drive part (28) which is attached to the end effector to drive the end effector.

According to the fifth aspect, there is provided a horizontal articulated robot (10), comprising a fixed part (20), a first arm (21) which is supported by the fixed part so as to be rotatable about a first axis of rotation (A1), a second arm (22) which is supported by the first arm so as to be rotatable about a second axis of rotation (A2) parallel to the first axis of rotation, on a far side with respect to the fixed part, and a working shaft (25) which is attached to the second arm so as to be rotatable about a third axis of rotation (A3) parallel to the second axis of rotation and capable of moving up and down, wherein a first distance (L1) between the first axis of rotation and the second axis of rotation is shorter than a second distance (L2) between the second axis of rotation and the third axis of rotation, a protrusion length of the working shaft, which is capable of protruding from the second arm toward the fixed part, is longer than a third distance (L3) between the first arm and the second arm along the second axis of rotation, the horizontal articulated robot further comprising an offset member (26) which is rotatably supported by the working shaft on a distal end of the working shaft, wherein a length of the offset member extending perpendicularly from the third axis of rotation is set so as to be equal to or greater than a fourth distance (L4) between the first axis of rotation and the third axis of rotation when the first arm and the second arm extend in directions opposite to each other.

According to the sixth aspect, in the fifth aspect, there is further provided a joint part (23) arranged between the first arm and the second arm.

According to the seventh aspect, in the fifth or sixth aspect, there is further provided an end effector (27) attached to a distal end of the offset member, and a drive part (28) which is attached to the end effector to drive the end effector.

According to the eighth aspect, in any of the fifth to seventh aspects, the robot is suspended from a pedestal (40, 45) or ceiling (C).

According to the ninth aspect, in any of the fifth to seventh aspects, the robot is installed on a floor (L).

Effects of the Aspects

In the first aspect, since the first distance is shorter than the second distance, the working shaft can protrude toward the fixed part beyond the height of the lower surface of the first arm. Thus, a long working shaft can be secured, whereby the stroke of the working shaft can be lengthened.

In the fifth aspect, since the first distance is shorter than the second distance, the working shaft can protrude toward the fixed part beyond the height of the lower surface of the first arm. Thus, a long working shaft can be secured, whereby the stroke of the working shaft can be lengthened.

Further, since the offset member is equal to or greater than the fourth distance, the end effector can reach to the first axis of rotation. Thus, the occurrence of a dead zone around the first axis of rotation can be prevented.

Though the embodiments of the present invention have been described above, a person skilled in the art would understand that various modifications and changes can be made without deviating from the scope of the claims of the present disclosure, which are described later.

REFERENCE SIGNS LIST 10 robot
20 fixed part
21 first arm
22 second arm
23 joint part
25 working shaft
26 offset member
27 end effector
28 drive part
40 pedestal
41 column
42 beam
45 pedestal

The invention claimed is:

1. A horizontal articulated robot which is suspended from a pedestal or ceiling, comprising:
    a fixed part,
    a first arm which is supported by the fixed part so as to be rotatable about a first axis of rotation,
    a second arm which is supported by the first arm so as to be rotatable about a second axis of rotation parallel to the first axis of rotation, and
    a working shaft which is attached to the second arm so as to be rotatable about a third axis of rotation parallel to the second axis of rotation and capable of moving up and down, wherein
    a first distance between the first axis of rotation and the second axis of rotation is shorter than a second distance between the second axis of rotation and the third axis of rotation, and
    a protrusion length of the working shaft, which is capable of protruding from the second arm toward the fixed part, is longer than a third distance between the first arm and the second arm along the second axis of rotation;
    the horizontal articulated robot further comprising:
    an offset member, a proximal end thereof, is rotatably supported to the working shaft on a distal end of the working shaft, wherein a length of the offset member extending perpendicularly from the third axis of rotation is set so as to be equal to or greater than a fourth distance between the first axis of rotation and the third axis of rotation when the first arm and the second arm extend in directions opposite to each other,
wherein the offset member extends perpendicular to the working shaft and the third axis of rotation; and wherein the offset member extends parallel to the second arm on the bottom side of the second arm, wherein, when the first arm and the second arm are arranged to extend in opposite directions, the distal end of the offset member reaches the first axis of rotation on the lower side of the second arm.

2. A horizontal articulated robot, comprising:
    a fixed part,
    a first arm which is supported by the fixed part so as to be rotatable about a first axis of rotation,
    a second arm which is supported by the first arm so as to be rotatable about a second axis of rotation parallel to the first axis of rotation, and
    a working shaft which is attached to the second arm so as to be rotatable about a third axis of rotation parallel to the second axis of rotation and capable of moving up and down, wherein
    a first distance between the first axis of rotation and the second axis of rotation is shorter than a second distance between the second axis of rotation and the third axis of rotation,
    a protrusion length of the working shaft, which is capable of protruding from the second arm toward the fixed part, is longer than a third distance between the first arm and the second arm along the second axis of rotation, the horizontal articulated robot further comprising:
    an offset member, a proximal end thereof, is rotatably supported to the working shaft on a distal end of the working shaft, wherein
    a length of the offset member extending perpendicularly from the third axis of rotation is set so as to be equal to or greater than a fourth distance between the first axis of rotation and the third axis of rotation when the first arm and the second arm extend in directions opposite to each other,
wherein the offset member extends perpendicular to the working shaft and the third axis of rotation; and wherein the offset member extends parallel to the second arm on the bottom side of the second arm, wherein, when the first arm and the second arm are arranged to extend in opposite directions, the distal end of the offset member reaches the first axis of rotation on the lower side of the second arm.

3. The horizontal articulated robot according to claim 2, wherein the robot is suspended from a pedestal or ceiling.

* * * * *